(12) United States Patent
Cao

(10) Patent No.: US 10,865,853 B2
(45) Date of Patent: Dec. 15, 2020

(54) MULTI-CRANKSHAFT CYCLOIDAL PIN WHEEL REDUCER

(71) Applicant: SHENZHEN LLMACHINECO., LTD, Shenzhen (CN)

(72) Inventor: Xianhong Cao, Shenzhen (CN)

(73) Assignee: SHENZHEN LLMACHINECO., LTD, Shenzhen (CN)

( * ) Notice: Subject to any disclaimer, the term of this patent is extended or adjusted under 35 U.S.C. 154(b) by 84 days.

(21) Appl. No.: 16/204,768

(22) Filed: Nov. 29, 2018

(65) Prior Publication Data
US 2019/0331199 A1 Oct. 31, 2019

(30) Foreign Application Priority Data

Apr. 25, 2018 (CN) .......................... 2018 1 0381471

(51) Int. Cl.
*F16H 1/32* (2006.01)
(52) U.S. Cl.
CPC ......... *F16H 1/32* (2013.01); *F16H 2001/323* (2013.01); *F16H 2001/324* (2013.01); *F16H 2001/325* (2013.01)
(58) Field of Classification Search
None
See application file for complete search history.

(56) References Cited

U.S. PATENT DOCUMENTS

| 3,430,523 | A * | 3/1969 | Merritt ...................... F16H 1/32 475/159 |
| 7,819,770 | B2 * | 10/2010 | Haga ........................ F16H 1/32 475/163 |
| 7,988,581 | B2 * | 8/2011 | Kobayashi ................ F16H 1/32 475/162 |
| 8,100,807 | B2 * | 1/2012 | Miyoshi ................... F16H 1/32 475/178 |
| 9,752,653 | B1 * | 9/2017 | Yao .......................... F16H 1/32 |
| 10,544,857 | B2 * | 1/2020 | Nishimura ......... G01N 33/2888 |
| 2010/0179013 | A1 * | 7/2010 | Nakamura ................ F16H 1/32 475/179 |
| 2017/0106543 | A1 * | 4/2017 | Andoh ...................... F16H 1/32 |
| 2019/0285143 | A1 * | 9/2019 | Sasaki ...................... F16H 1/34 |

* cited by examiner

*Primary Examiner* — Ernesto A Suarez
*Assistant Examiner* — James J Taylor, II

(57) ABSTRACT

Disclosed is a multi-crankshaft cycloidal pin wheel reducer. The gland and the wheel base are fixedly connected by a connecting shaft through screws and are rotated by the main bearing, coaxially with the pin gear shell, with intermediate crankshaft and pin gear shell and roller pin constitutes a cycloidal pin wheel together with the first and second cycloidal to form a rotating pair connection respectively. The plurality of planetary bearings are provided on inner rings of the gland and the wheel base, with the planetary crankshafts being mounted between each pair of the planetary bearings. The planetary crankshafts are coupled with the first cycloidal wheel and the second cycloidal wheel, respectively through the eccentric bearing, to form a rotating pair connection, so as to form a multi-crankshaft force transmission structure. It has the advantages of smooth operation, low noise, high efficiency, and small angular transmission error.

5 Claims, 2 Drawing Sheets

US 10,865,853 B2

MULTI-CRANKSHAFT CYCLOIDAL PIN WHEEL REDUCER

CROSS REFERENCE TO RELATED APPLICATION

The present application claims priority to Chinese Patent Application No. 201810381471.X, filed Apr. 25, 2018, the entire contents of which is incorporated herein for all purposes by this reference.

TECHNICAL FIELD

The invention relates to a gear transmission device for transmitting rotational motion, and specifically to a gear including intermeshing elements other than an involute tooth or a cycloidal tooth, and more specifically to a multi-crankshaft cycloidal pin wheel reducer.

BACKGROUND

Many structures are applied as the output structure of the prior cycloidal pin wheel reducer, such as a RV structure type, a pin holes type, a floating disk type, a cross slider type, a bellows type, and the like. In the case of the RV structure type, it is required to use gears as the first stage input, which is noisy at high speed. In the case of the pin holes type, there is no bearing contact between the pin holes, and thus suffering a poor running stability. In the case of the floating disk type and the cross slider type, sliding fits are applied and thus it needs to leave a gap, thereby the accuracy is degraded. In the case of the bellows type, the structure and process ability are poor, so that it is not commonly used.

SUMMARY

In view of the shortcomings of the prior art, it is an object of the present invention to provide a multi-crankshaft cycloidal pin wheel reducer. It is designed to make the cycloidal pin wheel reducer run more smoothly, with lower noise, higher efficiency and less angular transmission errors.

The technical solution proposed by the present invention to solve the technical problem thereof is to provide a multi-crankshaft cycloidal pin wheel reducer, which includes: a gland, a first cycloidal wheel, an intermediate crankshaft, a planetary bearing, a planetary crankshafts, a pin gear shell, a second cycloidal wheel, a connecting shaft, a wheel base, an intermediate eccentric bearing, an intermediate bearing, the planetary eccentric bearing, a main bearing and roller pins. It is characterized in that:

the gland and the wheel base are fixedly connected by the connecting shaft through screws and are rotated by the main bearing coaxially with the pin gear shell, the intermediate crankshaft is coaxial with the gland or the wheel base, and as an output shaft of the reducer, constitutes a cycloidal pin wheel transmission structure together with the first cycloidal wheel, the second cycloidal wheel, the pin gear shell and the roller pins, the intermediate crankshaft is coupled with the gland and the wheel base through the intermediate bearing to form a rotating pair connection, and is coupled with the first cycloidal wheel and the second cycloidal wheel through the intermediate eccentric bearing to form a rotating pair connection, the plurality of planetary bearings are provided on inner rings of the gland and the wheel base, with the planetary crankshafts being mounted between each pair of the planetary bearings, and the planetary crankshafts are coupled with the first cycloidal wheel and the second cycloidal wheel, respectively through the eccentric bearing, to form a rotating pair connection, so as to form a multi-crankshaft force transmission structure.

When the intermediate crankshaft rotates at one round, the planetary crankshaft also rotates at one round in the same direction, but the first cycloidal wheel and the second cycloidal wheel move by a tooth distance in an opposite direction. Under the constraint of the planetary bearings and the planetary eccentric bearing, this movement is transmitted to the gland or the wheel base through the planetary crankshaft, thus decelerating the output.

The planetary eccentric bearing, between the planetary crankshafts and the first cycloidal wheel and between the planetary crankshafts and the second cycloidal wheel, is roller pin bearings without inner and outer rings.

Further,

The main bearing is an angular contact ball bearing, mounted in a back-to-back manner.

The intermediate eccentric bearing and the planetary eccentric bearing are roller pin bearings having a holder but without inner and outer rings.

The roller pins are mounted on an inner side of the pin gear shell, and the number of roller pins is one more than the teeth of the first cycloidal wheel or the second cycloidal wheel.

At least two of the planetary crankshafts are evenly distributed around the intermediate crankshaft.

The connecting shafts are evenly distributed around the intermediate crankshaft.

The advantages of the present invention are smooth operation, low noise, high efficiency, and small angular transmission error.

BRIEF DESCRIPTION OF THE DRAWING

The invention will be further described with reference to the accompanying drawings.

Figure 1:
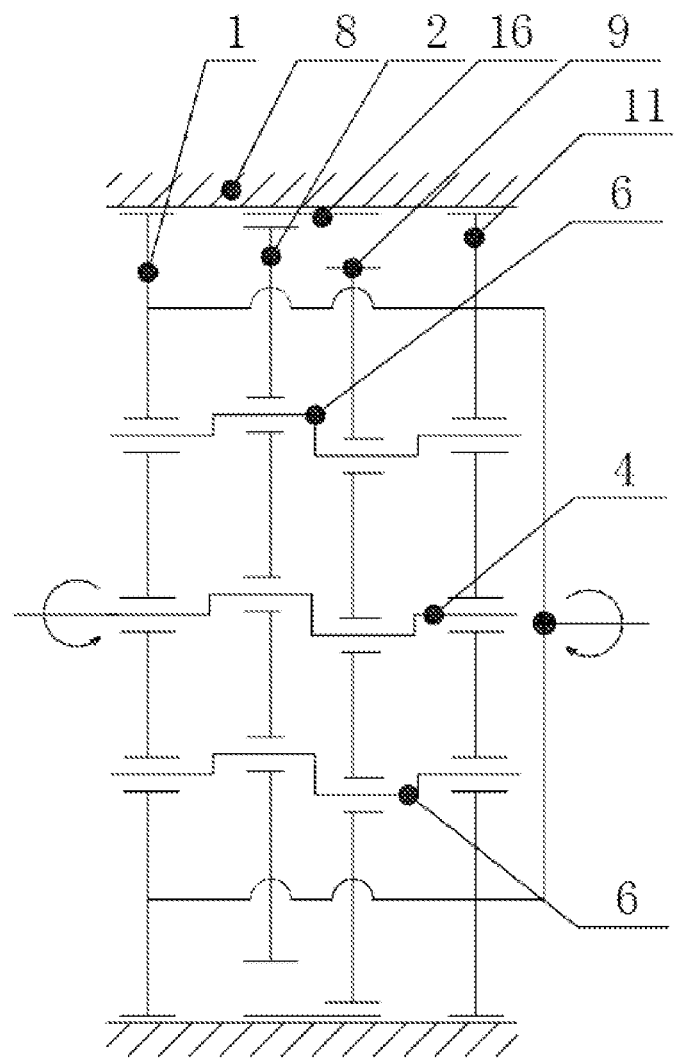
FIG. 1 is a schematic diagram of the present invention.
Figure 2:
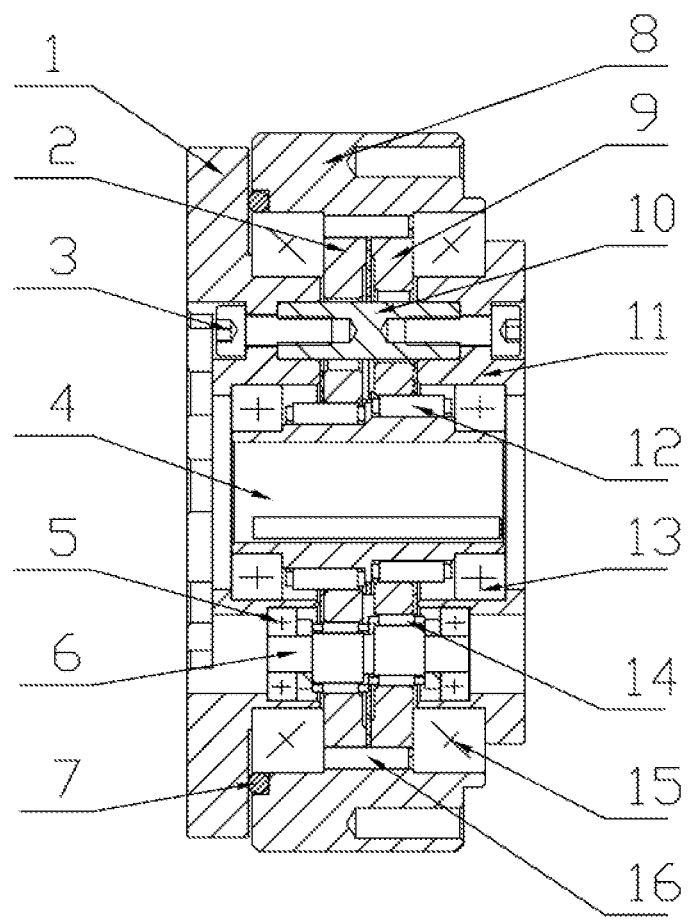
FIG. 2 is a structure schematic view of the present invention.
Figure 3:
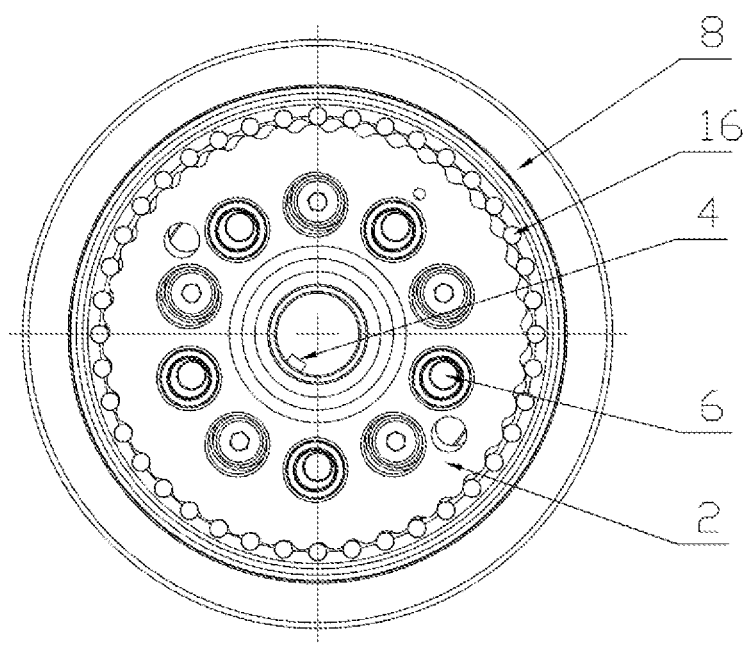
FIG. 3 is a schematic view showing the structure of a cycloidal needle wheel of the present invention.

In the figures: 1 is a gland, 2 is a first cycloidal wheel, 3 is a screw, 4 is an intermediate crankshaft, 5 is a planetary bearing, 6 is a planetary crankshaft, 7 is a sealing ring, 8 is a pin gear shell, 9 is a second cycloidal wheel, 10 is a connecting shaft, 11 is a wheel base, 12 is an intermediate eccentric bearing, 13 is an intermediate bearing, 14 is a planetary eccentric bearing, 15 is a main bearing, and 16 is a roller pin.

DETAILED DESCRIPTION

Referring to the drawings, a multi-crankshaft cycloidal pin wheel reducer of the present invention includes a gland 1, a first cycloidal wheel 2, an intermediate crankshaft 4, planetary bearings 5, a planetary crankshaft 6, a pin gear shell 8, a second cycloidal wheel 9, a connecting shaft 10, a wheel base 11, an intermediate eccentric bearing 12, an intermediate bearing 13, the planetary eccentric bearing 14, a main bearing 15 and roller pins 16.

The gland 1 and the wheel base 11 are fixedly connected by a connecting shaft 10 through screws 3 and are rotated by the main bearing 15 coaxially with the pin gear shell 8. The intermediate crankshaft 4 is coaxial with the gland 1 or the wheel base 11, and as an output shaft of the reducer, constitutes a cycloidal pin wheel transmission structure together with the first cycloidal wheel 2, the second cycloidal wheel 9, the pin gear shell 8 and roller pins 16. The intermediate crankshaft 4 forms a rotating pair connection with the gland 1 and the wheel base 11 through the intermediate bearing 13, and forms a rotating pair connection with the first cycloidal wheel 2 and the second cycloidal wheel 9 through the intermediate eccentric bearing 12. A plurality of planetary bearings 5 are provide on the inner rings of the gland 1 and the wheel base 11, and between each pair of the planetary bearings 5, the planetary crankshafts 6 are provided. The planetary crankshaft 6 forms a rotating pair connection with the first cycloidal wheel 2 and the second cycloidal wheel 9 respectively through the eccentric bearing 14, so as to form a multi-crankshaft force transmission structure.

When the intermediate crankshaft 4 rotates at one round, the planetary crankshaft 6 also rotates at one round in the same direction, but the first cycloidal wheel 2 and the second cycloidal wheel 9 are moved by a tooth distance in an opposite direction. Under the constraint of the planetary bearings 5 and the planetary eccentric bearing 14, this movement is transmitted to the gland 1 or the wheel base 11 through the planetary crankshaft 6, thereby decelerating the output.

The planetary crankshaft 6 is a force transmission shaft between the first cycloidal wheel 2 and the gland 1, the second cycloidal wheel 9 and the wheel base 11. The planetary eccentric bearing 14 between the planetary crankshaft 6, the first cycloidal wheel 2 and the second cycloidal wheel 9 is a roller pin bearing without inner and outer rings. Therefore, the planetary crankshaft 6 has to withstand large bending moment and impact force, and thus requires a strong wear resistance of the surface.

The intermediate crankshaft 4 and the planetary crankshaft 6 are parallel to each other and rotate at the same speed in the same direction. The difference is that the intermediate crankshaft 4 is an input shaft and a drive shaft, while the planetary crankshaft 6 is a transmission shaft and a driven shaft. At least two or more of the planetary crankshafts 6 are evenly distributed around the intermediate crankshaft 4.

In an embodiment of the present invention:

The main bearing 15 is an angular contact ball bearing, which is mounted in a back-to-back manner, and whose axial gap is eliminated through the gland 1, the wheel base 11, the connecting shaft 10 and the pin gear shell 8.

Roller pin bearings, having a holder but without inner and outer rings, are used as the intermediate eccentric bearing 12 and the planetary eccentric bearing 14.

Two cycloidal wheels 2 and 9 are used in the cycloidal pinion transmission mechanism, for the purpose of balancing the inertial force.

The roller pin 16 is mounted inside of the pin gear shell 8. The number of the roller pins 16 is one more than that of the teeth of the first cycloidal wheel 2 or the second cycloidal wheel 9.

At least two or more of the planetary crankshafts 6 are evenly distributed around the intermediate crankshaft 4, and the connecting shaft 10 is also evenly distributed around the intermediate crankshaft 4.

What is claimed is:

1. A multi-crankshaft cycloidal pin wheel reducer, including a gland, a first cycloidal wheel, an intermediate crankshaft, a plurality of planetary bearings, planetary crankshafts, a pin gear shell, a second cycloidal wheel, a connecting shaft, a wheel base, an intermediate eccentric bearing, an intermediate bearing, a planetary eccentric bearing, a main bearing, and roller pins, characterized in that:

the gland and the wheel base are fixedly connected by the connecting shaft through screws and are rotated by the main bearing coaxially with the pin gear shell, the intermediate crankshaft is coaxial with the gland or the wheel base, and as an output shaft of the reducer, constitutes a cycloidal pin wheel transmission structure together with the first cycloidal wheel, the second cycloidal wheel, the pin gear shell, and the roller pins, the intermediate crankshaft is coupled with the gland and the wheel base through the intermediate bearing to form a rotating pair connection, and is coupled with the first cycloidal wheel and the second cycloidal wheel through the intermediate eccentric bearing to form a rotating pair connection, the plurality of planetary bearings are provided on inner rings of the gland and the wheel base, each of the planetary crankshafts being mounted between a corresponding pair of the plurality of planetary bearings, and the planetary crankshafts are coupled with the first cycloidal wheel and the second cycloidal wheel, respectively through the planetary eccentric bearing, to form a rotating pair connection, so as to form a multi-crankshaft force transmission structure, wherein the planetary eccentric bearing, between the planetary crankshafts and the first cycloidal wheel and between the planetary crankshafts and the second cycloidal wheel, is a roller pin bearing without inner and outer rings.

2. The multi-crankshaft cycloidal pin wheel reducer according to claim 1, characterized in that, at least two of the planetary crankshafts are evenly distributed around the intermediate crankshaft.

3. The multi-crankshaft cycloidal pin wheel reducer according to claim 1, characterized in that, the main bearing is an angular contact ball bearing, mounted in a back-to-back manner.

4. The multi-crankshaft cycloidal pin wheel reducer according to claim 1, characterized in that, the intermediate eccentric bearing and the planetary eccentric bearing are roller pin bearings having a holder but without inner and outer rings.

5. The multi-crankshaft cycloidal pin wheel reducer according to claim 1, characterized in that, the roller pins are mounted on an inner side of the pin gear shell, and the number of roller pins is one more than the teeth of the first cycloidal wheel or the second cycloidal wheel.

* * * * *